United States Patent [19]

Depoorter et al.

[11] 3,765,900
[45] Oct. 16, 1973

[54] SPECTRALLY SENSITIZED SILVER HALIDE EMULSIONS

[75] Inventors: Henri Depoorter, Mortsel; Theofiel Hubert Ghys, Kontich, both of Belgium

[73] Assignee: Gevaert-Agfa N.V., Mortsel, Belgium

[22] Filed: Jan. 20, 1971

[21] Appl. No.: 108,163

[30] Foreign Application Priority Data
Feb. 17, 1970 Great Britain............... 7,586/70

[52] U.S. Cl.............. 96/140, 96/38.3, 260/240.4
[51] Int. Cl............................................ G03c 1/22
[58] Field of Search........................................ 96/140

[56] References Cited
UNITED STATES PATENTS

| | | | |
|---|---|---|---|
| 2,493,748 | 1/1950 | Brooker et al.............. | 96/140 |
| 2,497,876 | 2/1950 | Fallesen et al.............. | 96/140 |
| 2,828,203 | 3/1958 | MacWilliam................ | 96/140 |

FOREIGN PATENTS OR APPLICATIONS

| | | | |
|---|---|---|---|
| 1,234,522 | 2/1967 | Germany................ | 96/140 |

*Primary Examiner*—J. Travis Brown
*Attorney*—Brufsky, Staas, Breiner & Halsey

[57] ABSTRACT

Novel merocyanine dyes are provided which correspond to the general formula:

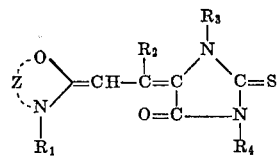

wherein:
Z represents the atoms necessary to close an oxazole nucleus,
$R_1$ stands for sulphatoalkyl, phosphonoalkyl or AWNHVB wherein each of W and V represents carbonyl, sulphonyl or a single bond, at least one of W and V being sulphonyl, A stands for alkylene and B stands for hydrogen, an alkyl group or an amino group, B not being hydrogen when V stands for carbonyl or sulphonyl, and
each of $R_2$, $R_3$ and $R_4$ stands for hydrogen, an aliphatic group or an aryl group one of $R_3$ and $R_4$ being an aliphatic group or aryl group substituted by sulpho, carboxy or alkoxycarbonyl, the acidic groups being in the free acid form or salt form. These merocyanine dyes can be used for the spectral sensitization of light-sensitive silver halide emulsions. They do not enhance the fog and leave practically no residual stain after processing and therefore are particularly suitable for the sensitization of Lippmann-emulsions, emulsions of the lith-type and emulsions used in stabilisation processing.

6 Claims, No Drawings

SPECTRALLY SENSITIZED SILVER HALIDE EMULSIONS

The present invention relates to novel merocyanine dyes, to the preparation thereof, to their use as spectral sensitizers for light-sensitive elements, more particularly silver halide emulsion layers, and to light-sensitive elements sensitized therewith.

In accordance with the present invention novel merocyanine dyes are provided which correspond to the following general formula I :

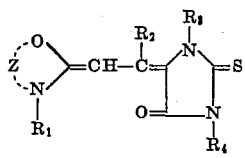

wherein :
Z stands for the atoms necessary to close an oxazole ring including substituted oxazole and oxazole with fused-on aromatic ring such as benzoxazole,
$R_1$ stands for sulphatoalkyl such as sulphatopropyl and sulphatobutyl, phosphonoalkyl or the group AWNHVB as e.g. described in United Kingdom Patent Specification 904,332 wherein each of W and V represents carbonyl, sulphonyl or a single bond, at least one of W and V being sulphonyl, A represents an alkylene group e.g. a $C_1$—$C_4$ alkylene group and B represents hydrogen, alkyl including substituted alkyl, amino including substituted amino e.g. acylamino, diethylamino and dimethylamino, with the proviso that B does not represent hydrogen when V stands for carbonyl or sulphonyl, the group AWNHVB being exemplified by N-(methylsulphonyl)-carbamoylmethyl, γ-(acetylsulphamoyl)-propyl and δ-(acetylsulphamoyl)-butyl, $R_2$, $R_3$ and $R_4$ stand for hydrogen, a saturated or unsaturated aliphatic group, such as alkyl including substituted alkyl, aralkyl including substituted aralkyl, allyl and cycloalkyl including substituted cycloalkyl, or aryl including substituted aryl, one of $R_3$ and $R_4$ being an aliphatic or an aryl group substituted by a sulpho group, a carboxy group or an alkoxycarbonyl group.

The acidic groups may be present in the free acid form or the salt form.

Representative examples of merocyanine dyes corresponding to the above general formula are given in the following table.

TABLE

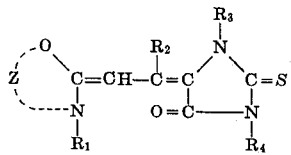

| Dye |  | $R_1$ | $R_2$ | $R_3$ | $R_4$ | Abs. max. (nm.) | $\epsilon.10^{-4}$ |
|---|---|---|---|---|---|---|---|
| 1 | Benzoxazole | Na CH$_2$CONSO$_2$CH$_3$ | H | CH$_2$COOC$_2$H$_5$ | C$_2$H$_5$ | 498 | 9.1 |
| 2 | do | (CH$_2$)$_3$OSO$_3$Na | H | CH$_2$COOH | C$_2$H$_5$ | 485 | 6.1 |
| 3 | do | (CH$_2$)$_3$OSO$_3$Na | H | CH$_2$COOH |  | 488 | 6.9 |
| 4 | do | (CH$_2$)$_3$OSO$_3$H·N(C$_2$H$_5$)$_3$ | H | CH$_2$COOCH$_3$ | C$_2$H$_5$ | 482 | 8.1 |
| 5 | do | (CH$_2$)$_3$OSO$_3$H·N(C$_2$H$_5$)$_3$ | H | CH$_2$COOCH$_3$ |  | 487 | 8.4 |
| 6 | do | (CH$_2$)$_3$OSO$_3$H·N(C$_2$H$_5$)$_3$ | H | CH$_2$COOC$_2$H$_5$ | C$_2$H$_5$ | 482 | 7.9 |
| 7 | do | (CH$_2$)$_3$OSO$_3$Na | H | CH$_2$COOC$_2$H$_5$ |  | 490 | 7.3 |
| 8 | do | (CH$_2$)$_3$OSO$_3$Na | H | C$_2$H$_5$ | CH$_2$COOC$_2$H$_5$ | 485 | 7.7 |
| 9 | do | (CH$_2$)$_3$OSO$_3$Na | H | C$_2$H$_5$ | COOC$_2$H$_5$ | 488 | 8.9 |
| 10 | do | (CH$_2$)$_3$OSO$_3$H·N(C$_2$H$_5$)$_3$ | H | 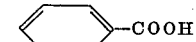—COOH | CH$_3$ | 482 | 6.4 |
| 11 | do | (CH$_2$)$_3$OSO$_3$Na | H | 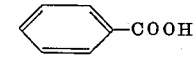—COOH | CH$_3$ | 483 | 6.9 |
| 12 | do | (CH$_2$)$_3$OSO$_3$H·N(C$_2$H$_5$)$_3$ | H | 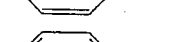—COOH |  | 482 | 7.1 |
| 13 | do | (CH$_2$)$_3$OSO$_3$H·N(C$_2$H$_5$)$_3$ | H | 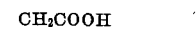—COOC$_2$H$_5$ |  | 485 | 8.4 |
| 14 | do | (CH$_2$)$_4$SO$_2$NHCOCH$_3$ | H | CH$_2$COOH | C$_2$H$_5$ | 482 | 7.3 |
| 15 | do | (CH$_2$)$_4$SO$_2$NHCOCH$_3$ | H | CH$_2$COOH |  | 485 | 5.9 |
| 16 | do | (CH$_2$)$_4$SO$_2$NHCOCH$_3$ | H | CH$_2$COOCH$_3$ | C$_2$H$_5$ | 487 | 7.1 |
| 17 | do | (CH$_2$)$_4$SO$_2$NHCOCH$_3$ | H | CH$_2$COOCH$_3$ |  | 488 | 7.3 |

Table Continued

| Dye | ⟨-O-N⟩ | $R_1$ | $R_2$ | $R_3$ | $R_4$ | Abs. max. (nm.) | $\epsilon.10^{-4}$ |
|---|---|---|---|---|---|---|---|
| 18 | do | $(CH_2)_4SO_2NHCOCH_3$ | H | $CH_2COOC_2H_5$ | $C_2H_5$ | 485 | 7.5 |
| 19 | do | $(CH_2)_4SO_2NHCOCH_3$ | H | $CH_2COOC_2H_5$ | ⟨phenyl⟩ | 490 | 8.2 |
| 20 | do | $(CH_2)_4SO_2NHCOCH_3$ | H | $C_2H_5$ | $CH_2COOC_2H_5$ | 485 | 7.7 |
| 21 | do | $(CH_2)_3OSO_3H \cdot N(C_2H_5)_3$ | H | $CH_2COOC_2H_5$ | $CH_3$ | 481 | 8.4 |
| 22 | do | $CH_2CONHSO_2CH_3 \cdot N(C_2H_5)_3$ | H | $CH_2COOC_2H_5$ | $CH_3$ | 482 | 8.6 |
| 23 | do | $(CH_2)_3OSO_3Na$ | H | $CH_2COOH$ | $CH_3$ | 482 | 5.1 |
| 24 | do | $(CH_2)_3OSO_3Na$ | H | $(CH_2)_3SO_3Na$ | ⟨phenyl⟩ | 487 | 8 |

NOTE.—The spectral data given in the table were obtained from measurements with solutions of the dyes in methanol, except for dye 1 where the measurement occurred in methanol-water (1:1), dye 11 where the measurement occurred in dimethylformamide and dyes 16 and 17 where the measurements occurred in ethylene glycol monomethyl ether.

The merocyanine dyes according to the present invention can be prepared by methods known to those skilled in the art e.g. by condensing a cyclammonium quaternary salt corresponding to the formula II :

II.
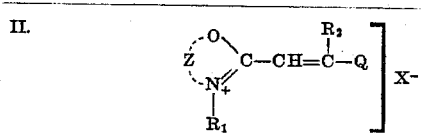

wherein :

Z, $R_1$ and $R_2$ have the same significance as above,
Q stands for arylamino, preferably acylated arylamino e.g. acetanilino, and
$X^-$ stands for an anion, but does not exist when $R_1$ itself contains an anionic group, with a thiohydantoine compound of the formula III :

III.
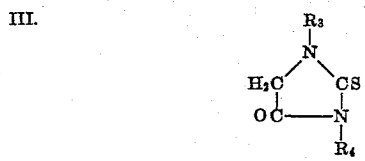

wherein :
each of $R_3$ and $R_4$ have the same significance as above.

The condensations are advantageously carried out in the presence of a basic condensing agent e.g. a tertiary amine such as trimethylamine, triethylamine, dimethylaniline, or a N-alkylpiperidine. A reaction medium is advantageously employed e.g. pyridine, a lower molecular weight alcohol such as ethanol, dimethylsulphoxide, acetonitrile, etc.

The following preparations illustrate how the dyes corresponding to the above formula I can be prepared :

PREPARATION 1 — DYE 1 a. 2-(2-anilinovinyl)-3-methylsulphonylcarbamylmethyl-benzoxazolium bromide

Thirty ml of acetic anhydride, 20.8 g (0.106 mole) of diphenylformamidine and 18.4 g (0.053 mole) of 2-methyl-3-methylsulphonylcarbamylmethyl-benzoxazolium bromide were heated on an oil bath at 130°C. The mixture become a homogeneous melt and then solidified. Heating should not exceed 10 minutes. Upon cooling, acetone was added whereupon the product was collected and washed with acetone and ether.
Yield : 11.5 g (48 %).
Melting point : above 260°C.

b. Dye 1

A mixture of 1.15 g (0.005 mole) of 1-ethoxycarbonylmethyl-3-ethyl-2-thiohydantoine, 2.26 g (0.005 mole) of 2-(2-anilinovinyl)-3-methylsulphonylcarbamylmethylbenzoxazolium bromide, 15 ml of dimethylsulphoxide, 1.4 ml (0.01 mole) of triethylamine and 1 ml of acetic anhydride was heated to 50°C whereupon, after 10 minutes, it was poured into ether/hexane (1:1). The dye that precipitated was converted into the sodium salt by dissolving it in ethanol and mixing the solution with an aqueous solution of sodium iodide. Impurities were removed by digestion with boiling isopropanol.
Yield : 0.75 g.
Melting point : above 260°C.

PREPARATION 2 — DYE 5

To 3.74 g (0.01 mole) of anhydro-2-(2-anilinovinyl)-3-(3-sulphatopropyl)benzoxazolium hydroxide, prepared in a similar way as the benzoxazolium bromide of preparation 1 (yield : 93 % - melting point : 236°–238°C), and 2.64 g (0.01 mole) of 1-methoxycarbonylmethyl-3-phenyl-2-thiohydantoine in 15 ml of dimethylsulphoxide was added a mixture of 20 ml of acetonitrile, 2.8 ml (0.02 mole) of triethylamine and 1.1 ml (0.01 mole) of acetic anhydride. The mixture was heated for 10 mintues on a water-bath at 60°–70°C whereupon it was poured into ether. The dye that precipitated was washed with ether and recrystallized from isopropanol.
Yield : 3.8 g
Melting point : 196°C.

PREPARATION 3 — DYE 7

3.74 g (0.01 mole) of anhydro-2-(2anilinovinyl)-3-(3-sulphatopropyl)benzoxazolium hydroxide, 2.5 g (0.01 mole) of 1-ethoxy-carbonylmethyl-3-phenyl-2-thiohydantoine, 30 ml of acetonitrile, 1.1 ml (0.01 mole) of acetic anhydride, and 5.6 ml (0.04 mole) of triethylamine were heated on a boiling water-bath until a homogeneous solution was obtained (about 5 minutes). The mixture was cooled and then poured into ether. The oily precipitate was dissolved in a minimum quantity of hot water, added to a same volume of a saturated sodium chloride solution and left standing overnight. The dye formed was collected by filtration, washed with isopropanol and recrystallized from ethanol.
Yield : 1.6 g.
Melting point : 190°C.

PREPARATION 4 — DYE 9

A suspension of 2.16 g (0.01 mole) of 1-ethyl-2-ethoxycarbonyl-2-thiohydantoine, 3 g (0.008 mole) of anhydro-2-(2-anilinovinyl)-3-(3-sulphatopropyl)benzoxazolium hydroxide, 2.8 ml (0.02mole) of triethylamine, 1,1 ml (0.01 mole) of acetic anhydride and 15 ml of dimethyl sulphoxide was stirred for 15 minutes at 5°C, whereupon the mixture was poured into ether/hexane (1:1). The sticky precipitate was converted into the sodium salt with sodium iodide as described in preparation 1. The dye was recrystallized from ethanol/water. Yield : 0.65 g.
Melting point : 235°–238°C.

PREPARATION 5 : DYE 15

To 4.94 g (0.01 mole) of 2-(2-anilinovinyl)-3-(4-acetylsulphamylbutyl)-benzoxazolium bromide, prepared in a similar way as the benzoxazolium bromide of preparation 1 (Yield : 44 % - Melting Point : 238°–240°C) and 2.5 g (0.01 mole) of 1-carboxymethyl-3-phenyl-2-thiohydantione in 25 ml of acetonitrile were added : 1.1 ml of acetic anhydride and 2.8 ml (0.02 mole) of triethylamine. The mixture was stirred for 30 minutes at ambient temperature whereupon the dye formed was collected by filtering with suction and recrystallized once from ethanol and twice from dimethylformamide.
Yield : 0.45 g.
Melting point : 200°C (with decomposition).

In accordance with the present invention photographic materials are provided comprising light-sensitive silver halide emulsion layers containing a merocyanine dye corresponding to the above general formula.

The hydrophilic colloid used as the vehicle for the silver halide may be any of the common hydrophilic colloids employed in photographic light-sensitive emulsions, for example gelatin, agar-agar, albumine, zein, casein, collodion, alginic acid, water-soluble cellulose derivatives such as carboxymethylcellulose, polyvinyl alcohol, poly-N-vinyl pyrrolidone or other hydrophilic synthetic or natural resins or polymeric compounds, gelatin being, however, favoured. If desired, compatible mixtures of two or more colloids may be employed for dispersing the silver halide.

The merocyanine dyes according to the present invention have an excellent sensitizing action in the green region of the spectrum and this sensitizing activity is not influenced under conditions of increased temperature and relative humidity. Since the dyes according to the present invention do not enhance the fog and leave practically no residual stain after processing they are particularly suitable for the sensitization of emulsions of the Lippmann-type, especially the high-resolution Lippmann-emulsions of use for microelectronic mask-making used in the production of micro-electric integrated circuits, for the sensitization of emulsions of the "lith" type of use in photomechanical reproduction techniques, and for the sensitization of emulsions of use in stabilization processing according to which the photographic record is produced in the least possible time.

Photographic materials of use for microelectronic mask making comprise silver halide emulsion layers of the Lippmann-type having a layer thickness comprised between 3 and 8 microns. These silver halide emulsions of the Lippmann-type have an average grain-size of less than 0.1 micron; they are preferably gelatino-silver bromide emulsions which may comprise at most 8 mole % of silver iodide and have a ratio of silver halide to gelatin comprised between 1:15 and 5:1. They should allow a correct reproduction of the dimensions of the integrated circuit images and therefore should be substantially free from staining.

Photographic materials of use for photomechanical reproduction techniques comprising silver halide emulsion layers of the "lith" type, i.e. fine-grained emulsions of high contrast containing at least 50 mole percent of silver chloride, should also be substantially free of staining so that very sharp screen dots and screen lines can be obtained. Emulsions of the lith-type are usually developed in developers containing only hydroquinone as developing agent and having a low sulphite content which is achieved by the presence of formaldehyde forming formaldehyde-bisulphite compounds keeping the sulphite concentration at a low and constant value.

In stabilisation processing the residual non-exposed and non-developed silver halide is converted into light-inert complexes with the aid of a stabilising solution comprising stabilising agents. In these processes development is usually effected by means of a simple alkaline solution the developing agents being incorporated into the photographic emulsion layers. Since stabilisation processing occurs very rapidly, the whole processing generally lasting less than 1 minute, the sensitizing dyes used should be such that they are removed or decolourised in this short processing time so that no stain is left in the material. In stabilisation processing the silver halide emulsion layer(s) is (are) preferably pure silver chloride emulsions or silver chlorobromide or silver chlorobromoiodide emulsions having at least 90 mole percent of silver chloride and an average silver halide grain-size which is comprised between 0.1 and 0.3 microns. An emulsion layer of this type is characterised in that the latent image produced on imagewise exposure is fully developed within 10 seconds upon contact of the solution effecting development with the image-wise exposed silver halide grians.

Most of the known sensitizing dyes, even those comprising solubilizing groups, though they are satisfactory for use in ordinary photographic materials that are processed in the classical way, were found to be unsuitable for the above applications because they produce stains and undesirable colourations.

The methods of incorporating the dyes in the emulsion are simple and well known to those skilled in the art of emulsion making. They are generally added to the emulsion in the form of a solution in a suitable solvent e.g. an alcohol such as methanol, or a mixture of an alcohol and water. The solvent must of course be compatible with the emulsion and substantially free from any deleterious effect on the light-sensitive material.

The sensitizing dyes of use according to the invention can be incorporated at any stage of emulsion preparation and should be uniformly distributed througout the emulsion. They are preferably incorporated after the chemical ripening and just before coating.

Various silver salts may be used as the light-sensitive salt such as silver chloride, silver bromide, silver iodide or mixed silver halides such as silver chlorobromide, silver bromoiodide and silver chlorobromoiodide.

The concentration in the emulsion of the sensitizing dyes corresponding to the above general formula I can vary between wide limits, for example from 1 mg to 1,000 mg per mole of silver halide. The most suitable and most economical concentration for any given emulsion will be apparent to those skilled in the art of emulsion making; it will vary according to the type of light-sensitive material and according to the effects desired.

The dyes are preferably incorporated into photographic emulsions the general sensitivity of which has been increased by chemical ripening. These emulsions may be chemically sensitized by effecting the ripening in the presence of small amounts of sulphur containing compounds such as allyl isothiocyanate, allyl thiourea, sodium thiosulphate, potassium selenocyanide, etc. The emulsions may also be sensitized by means of reducing sensitizers such as tin compounds, imino-aminomethane-sulphinic acid and derivatives thereof, cadmium salts, and the salts of noble metals such as gold, platinum, palladium, iridium, ruthenium and rhodium.

The dyes according to the present invention are not influenced by other emulsion additives such as hardeners, antifoggants, stabilizers, colour couplers, wetting agents, development accelerators, plasticizers, etc. and are fully compatible with developing agents that might be present in the emulsion e.g. as is often done in material for stabilisation processing.

Suitable hardening agents are amongst others formaldehyde, chrome alum, halogen-substituted aldehydes comprising a carboxyl group such as mucobromic acid, diketones, dialdehydes, etc.

Compounds suitable for sensitizing the emulsions by development acceleration are e.g. compounds of the polyoxyalkylene type such as alkylene oxide condensation products as described amongst others in U. S. Pat. specifications Nos. 2,531,832 and 2,533,990, in United Kingdom Patent Specification 920,637, 940,051, 945,340 and 991,608 and in Belgian Patent Specification 648,710 as well as onium derivatives of amino-N-oxides as described in United Kingdom Patent Specification 1,121,696.

Among the stabilizers customarily employed in emulsion may be mentioned mercury compounds such as the mercury compounds described in Belgian Patent Specifications 524,121, 677,337 and 707,386, U. S. Pat. specification No. 3,179,520, heterocyclic nitrogen containing thioxo compounds such as those described in German Patent Specification 1,151,731, benzothiazoline-2-thione and 1-phenyl-2-tetrazoline-5 -thione and compounds of the hydroxy-triazolopyrimidine type such as 5-methyl-7-hydroxy-s-triazolo[1,5-a] pyrimidine.

The emulsions sensitized in accordance with the present invention may be coated on a wide variety of photographic emulsion supports. Typical supports include cellulose ester film, polyvinyl acetal film, polystyrene film, polyethylene terephthalate film and related films of resinous materials as well as paper and glass.

The following examples illustrate the present invention.

EXAMPLE 1

Indentical portions of a lithographic silver halide emulsion, consisting of 76 mole percent of silver chloride, 23 mole percent of silver bromide and 1 mole percent of silver iodide, were spectrally sensitized by means of the dyestuffs listed in the table below.

The spectrally sensitized emulsion portions ready for coating contained 0.6 mole of silver halide per kg and 0.1 millimole of spectral sensitizer per mole of silver halide. Each of the emulsion portions was coated on a subbed polyethylene terephthalate support pro rata of 0.07 mole of silver halide per sq. m.

The sensitometric values obtained are listed in the table below. The sensitivity data are those measured upon exposure through a yellow filter that absorbs all light of a wavelength shorter than 460 nm, as compared with a not spectrally sensitized material.

| Spectrally sensitizing dye | $\Delta$ log Et* | Sens.max. (nm) | Stain |
|---|---|---|---|
| 1 | +2.63 | 535 | no |
| 2 | +2.55 | 530 | no |
| 4 | +2.55 | 535 | trace of orange |
| 5 | +2.55 | 540 | trace of orange |
| 6 | +2.48 | 530 | no |
| 7 | +2.85 | 540 | trace of pink |
| 8 | +2.63 | 525 | no |
| 9 | +2.55 | 535 | no |
| 10 | +2.25 | 520 | no |
| 11 | +2.32 | 530 | no |
| 12 | +2.32 | 525 | no |
| 13 | +2.63 | 530 | trace of pink |
| 14 | +2.70 | 530 | no |
| 15 | +2.70 | 535 | no |
| 17 | +2.63 | 545 | no |
| 19 | +2.63 | 530 | trace of orange |
| 20 | +2.70 | 530 | trace of orange |

* $\Delta$ log Et = + 0.30 means a doubling of the speed

EXAMPLE 2

Spectrally sensitized emulsion portions were prepared as described in Example 1. Each of the emulsion portions was coated on a subbed polyethylene terephthalate support pro rata of 0.07 mole of silver halide per sq.m.

The materials obtained were exposed in a sensitometer once without filter (general sensitivity) and once through a filter (spectral sensitivity) the transmission of which for light of a wavelength shorter than 390 nm is less than 0.1 percent and for light of a wavelength longer than 470 nm is more than 90 percent.

The sensitometric results obtained as well as the percentage residual staining measured after processing at the $\lambda_{max}$ of the dyestuff concerned are listed in the table below.

| Dye used | Sens. max. (nm.) | Exposure without filter | | Exposure through filter | | Percent residual staining |
|---|---|---|---|---|---|---|
| | | Fog | Relative general speed* (log Et) | Fog | Relative spectral speed* (log It) | |
| None | | 0.04 | 2.87 | 0.04 | | |
| Comparison dye with formula: 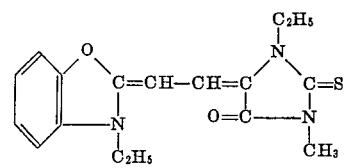 | 540 | 0.05 | 2.05 | 0.05 | 2.32 | 10 |
| Dye 3 | 530 | 0.05 | 2.18 | 0.05 | 2.42 | 0 |
| Dye 16 | 535 | 0.05 | 2.12 | 0.05 | 2.34 | 3 |
| Dye 18 | 540 | 0.05 | 2.20 | 0.05 | 2.36 | 5 |

*A decrease of the value by 0.3 means a doubling of the speed.

The above results show that the spectrally sensitizing dyes of the invention leave less stain upon processing than the comparison dye.

EXAMPLE 3

A silver bromide emulsion comprising 72 g of silver bromide and 93 g of gelatin was prepared by simultaneous addition of a silver nitrate solution and a potassium bromide solution to a 3 percent aqueous solution of gelatin. The conditions of precipitation were adjusted so that a Lippman emulsion with an average grain size of 0.07 μ was obtained. Details as to preparation of Lippmann emulsion can be found amongst others in P. Glafkides "Photographic Chemistry," Vol. 1, 1958, Fountain Press, London. The emulsion was divided into several portions and to each portion one of the sensitizers listed in the table below were added in an amount of 0.1 millimole per mole of silver halide.

The emulsions were then coated on glass plates and dried so as to obtain an emulsion layer thickness of 5 microns.

The materials thus obtained were exposed in a sensitometer once without filter (general sensitivity) and once through a filter (spectral sensitivity) the transmission of which for light of a wavelength shorter than 460 nm is less than 0.1 percent and for light of a wavelength longer than 550 nm is more than 90 percent.

The sensitometric results obtained as well as the percentage residual staining measured after processing at the $\lambda_{max}$ of the dyestuff concerned are listed in the table below.

EXAMPLE 4

A cellulose triacetate film support was provided at one side with a gelatin antihalation layer and at the other side with a gelatin-cellulose nitrate subbing layer, a gelatin intermediate layer having a dry weight of 4.0 g per sq.m, a light-sensitive gelatin silver halide emulsion layer containing hydroquinone and 1-phenyl-3-pyrazolidinone and a gelatin antistress layer comprising 1.5 g of gelatin per sq.m.

The silver halide emulsion used was a rapidly developable silver chlorobromoiodide (98 mole percent chloride, 1.8 mole percent bromide and 0.2 mole percent iodide) emulsion having an average grain size of about 1.8 micron and a ratio of gelatin to silver nitrate of 0.75 and comprising as spectral sensitizer one of the dyes listed in the table below in an amount of 88 mg per 100 g of silver nitrate used.

It was applied in such as way that per sq.m 2 g of hydroquinone, 0.3 g of 1-phenyl-3-pyrazolidinone and an amount of silver halide equivalent to 5.0 g of silver nitrate were present.

The light-sensitive material was image-wise exposed in a sensitometer whereupon it was guided in a compact automatic processing unit at a constant speed in order through the following four processing solutions at room temperature:

1. Activator liquid
sodium hydroxide 30 g
sodium sulphite 50 g
potassium bromide 2 g
water to make 1000 ml
2. Stabilizing liquid

| Dye used | Sens. max. (nm.) | Exposure without filter | | Exposure through filter | | Percent residual staining |
|---|---|---|---|---|---|---|
| | | Fog | Relative general speed* (log Et) | Fog | Relative spectral speed* (log It) | |
| None | | 0.04 | 4 | 0.04 | | |
| Comparison dye with formula: | 540 | 0.05 | 2.77 | 0.05 | 2.75 | 11 |
| Dye 14 | 540 | 0.04 | 2.27 | 0.04 | 2.68 | 0 |
| Dye 16 | 535 | 0.04 | 2.68 | 0.04 | 2.64 | 5 |
| Dye 21 | 535 | 0.04 | 3.08 | 0.04 | 3.16 | 2 |
| Dye 24 | 540 | 0.04 | 3.05 | 0.04 | 2.97 | 0 |

| | |
|---|---|
| ammonium thiocyanate | 250 g |
| sodium metabisulphite | 20 g |
| water to make | 1000 ml |
| sulphuric acid to adjust the pH to 4.5 | |
| 3. A fixer | |
| sodium thiosulphate | 200 g |
| potassium metabisulphite | 25 g |
| water to make | 1000 ml |
| 4. A rinsing liquid consisting of demineralised water | |

The total processing time was 16 seconds (i.e. 4 seconds for each of the processing liquids).

The results listed in the table below show that the dyes of the invention produce less fog and leave less residual staining than the comparison dye.

TABLE

| Dyestuff used | Sens. max. (nm.) | Fog | Relative speed | Percentage residual staining |
|---|---|---|---|---|
| Comparison dye with formula: 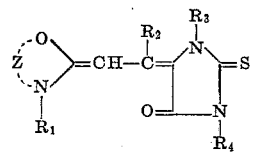 | 540 | 0.08 | 0.71 | 10 |
| Dye 11 | 530 | 0.06 | 1.33 | 3 |
| Dye 23 | 530 | 0.04 | 1.51 | 0 |

We claim:

1. A merocyanine silver halide emulsion spectrally sensitized by means of a merocyanaine dye corresponding to the formula :

[Formula with Z, $R_1$, $R_2$, $R_3$, $R_4$ substituents]

wherein :

Z stands for the atoms necessary to close an oxazole nucleus, or an oxazole nucleus with fused-on aromatic ring, $R_1$ stands for sulphatoalkyl, phosphonoalkyl or the group AWNHVB wherein each of W and V represents carbonyl, sulphonyl or a single bond at least one of W and V being sulphonyl, A stands for alkylene and B stands for hydrogen, an alkyl group or an amino group, B not being hydrogen when V stands for carbonyl or sulphonyl, and each of $R_2$, $R_3$ and $R_4$ stands for hydrogen, a saturated or unsaturated aliphatic group or an aryl group, one of $R_3$ and $R_4$ being an aliphatic group or aryl group substituted by sulpho, carboxy or alkoxycarbonyl, the acidic groups being in the free acid form or salt form.

2. A light-sensitive silver halide emulsion according to claim 1, wherein $R_1$ stands for sulphatoalkyl.

3. A light-sensitive emulsion according to claim 1, wherein said dye is present in the said emulsion in an amount of 1 to 1,000 mg per mole of silver halide.

4. A light-sensitive emulsion according to claim 1, wherein said emulsion is an emulsion of the Lippmann-type having an average silver halide grain-size of less than 0.1 micron.

5. A light-sensitive emulsion according to claim 1, wherein said emulsion is an emulsion of the lith-type comprising at least 50 mole percent of silver chloride.

6. A light-sensitive emulsion according to claim 1, wherein said emulsion is a rapidly developable emulsion for stabilisation processing comprising at least 90 mole percent of silver chloride.

* * * * *

UNITED STATES PATENT OFFICE
CERTIFICATE OF CORRECTION

Patent No. 3,765,900                    Dated   October 16, 1973

Inventor(s)   Henri DEPOORTER ET AL

It is certified that error appears in the above-identified patent and that said Letters Patent are hereby corrected as shown below:

Column 7, line 4, "grians" should read -- grains --; Column 7, line 22, "througout" should read -- throughout --. Column 11, line 30, claim 1, "A merocyanine silver halide emulsion" should read -- A light-sensitive silver halide emulsion --; Column 11, line 31, claim 1, "merocyanaine" should read -- merocyanine --.

Signed and sealed this 5th day of November 1974.

(SEAL)
Attest:

McCOY M. GIBSON JR.                          C. MARSHALL DANN
Attesting Officer                            Commissioner of Patents

FORM PO-1050 (10-69)